United States Patent
Kawamura et al.

(10) Patent No.: US 6,571,139 B1
(45) Date of Patent: May 27, 2003

(54) INFORMATION PROCESSING APPARATUS, INFORMATION PROCESSING SYSTEM, INFORMATION PROCESSING METHOD, AND PROVIDING MEDIUM

(75) Inventors: Harumi Kawamura, Tokyo (JP); Mari Horiguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/463,798

(22) PCT Filed: May 28, 1999

(86) PCT No.: PCT/JP99/02852

§ 371 (c)(1),
(2), (4) Date: Apr. 3, 2000

(87) PCT Pub. No.: WO99/63445

PCT Pub. Date: Dec. 9, 1999

(30) Foreign Application Priority Data

May 29, 1998 (JP) ............................................. 10-149537

(51) Int. Cl.$^7$ ................................................ G05B 15/00
(52) U.S. Cl. ................................ 700/83; 700/17; 710/8; 710/9; 710/14
(58) Field of Search ................................ 700/2, 83, 17, 700/264; 710/8–9, 14; 345/713, 712

(56) References Cited

U.S. PATENT DOCUMENTS

| | | | | |
|---|---|---|---|---|
| 5,629,868 A | * | 5/1997 | Tessier et al. | ............... 348/164 |
| 5,768,224 A | * | 6/1998 | Tanaka et al. | ................. 369/2 |
| 5,917,723 A | * | 6/1999 | Binford | ........................ 700/2 |
| 6,148,241 A | * | 11/2000 | Ludtke et al. | ................ 700/83 |
| 6,247,069 B1 | * | 6/2001 | Smyers | ......................... 710/8 |
| 6,313,812 B1 | * | 11/2001 | Nagano et al. | .............. 345/2.1 |

FOREIGN PATENT DOCUMENTS

| | | | | |
|---|---|---|---|---|
| JP | 3-191635 | 8/1991 | ........... | H04L/12/40 |
| JP | 5-31406 | 4/1993 | ........... | H04L/12/40 |
| JP | 6-214935 | 8/1994 | ........... | G06F/13/14 |
| JP | 7-212662 | 8/1995 | ........... | H04N/5/44 |

* cited by examiner

Primary Examiner—Emanuel Todd Voeltz
Assistant Examiner—Crystal J. Barnes
(74) Attorney, Agent, or Firm—Frommer Lawrence & Haug LLP; William S. Frommer; Gordon Kessler

(57) ABSTRACT

In order to set a user information such as a nickname, memo or the like easily in an electronic appliance, text data or graphic data about the appliance entered on the basis of a specified manipulation or command is written by using a part of the descriptor which can be read out by the command conforming to a specified protocol from other appliance connected mutually through a bus, and when displaying about the appliance, the nickname, memo or the like by the text data or graphic data written in the descriptor is displayed.

17 Claims, 15 Drawing Sheets

Internal Bus 19

IRD 1

| object entry | entry_type value | Comment |
|---|---|---|
| Nickname | 10 | This object may exist in a nickname list. |

| address_offset | contents |
|---|---|
| \multicolumn{2}{c}{entry_specific_information} ||

| address_offset | contents |
|---|---|
| 00 | language_id_specifier |
| 01 | |
| 02 | language_id |
| 03 | |
| 04 | string_info |
| ⋮ | |
| ⋮ | |

FIG. 7

| object entry | entry_type value | Comment |
|---|---|---|
| User_specific_info | 11 | This object may exist in a user specific info list. |

| entry_specific_information ||
|---|---|
| address_offset | contents |
| 00 | language_id_specifier |
| 01 | |
| 02 | language_id |
| 03 | |
| 04 | string_info |
| ⋮ | |
| ⋮ | |

FIG. 10

| descriptor_identifier for unit status descriptor ||
|---|---|
| address_offset | contents |
| 00 | 80 |

FIG. 11

| address | contents |
|---|---|
| | Unit Status Descriptor |
| 00 00 | descriptor_length |
| 00 01 | |
| 00 02 | general_unit_status |
| ⋮ | |
| ⋮ | number_of_input_plugs (n) |
| ⋮ | input_plug_status [0] |
| ⋮ | ⋮ |
| ⋮ | input_plug_status [n-1] |
| ⋮ | number_of_output_plugs (n) |
| ⋮ | output_plug_status [0] |
| ⋮ | ⋮ |
| ⋮ | output_plug_status [n-1] |
| ⋮ | |

FIG. 12

| general_unit_status | |
|---|---|
| address_offset | contents |
| 00 | number_of_information (n) |
| 01 | info_type [0] |
| 02 | descriptor_identifier for the information [0] |
| ⋮ | |
| ⋮ | ⋮ |
| ⋮ | info_type [n-1] |
| ⋮ | descriptor_identifier for the information [n-1] |
| ⋮ | |

FIG. 13

| Info_type for general_unit_status | |
|---|---|
| Value | meaning |
| 10 | nickname |
| 11 | user specific information |

*FIG. 16*

| 0000 | ctype | unit_type | unit ID | opcode | operand[0] |
|---|---|---|---|---|---|
| operand[1] | | operand[2] | | operand[3] | operand[4] |
| ... | | | | | |
| operand[n] | | zero pad bytes (if necessary) | | | |

INFORMATION PROCESSING APPARATUS, INFORMATION PROCESSING SYSTEM, INFORMATION PROCESSING METHOD, AND PROVIDING MEDIUM

TECHNICAL FIELD

The present invention relates to an information processing apparatus, an information processing system, an information processing method, and a providing medium, and more particularly to an information processing apparatus, an information processing system, an information processing method, and a providing medium capable of discriminating electronic appliances of the same type easily at a user side when a plurality of electronic appliances are connected through an IEEE 1394 bus or the like, and allowing the user to read and write necessary information directly from and in each electronic appliance.

BACKGROUND ART

As a system composed by connecting a plurality of electronic appliances and communicating among them, a system using the IEEE 1394 bus is known. In this system, when a plurality of electronic appliances of the same type are connected, one of the means for discriminating them is a technique of furnishing the electronic appliance main bodies with slide switches and assigning by numerals, such as VTR1, VTR2, and so forth.

In this conventional technique, the user must identify the VTR1 and VRT2 with actual electronic appliances, and it was a burden for the user side. As an improving measure thereof, a method of discriminating electronic appliances of the same type by providing the electronic appliances with easy names or nicknames by the user is disclosed, for example, in Japanese Laid-open Patent No. 7-212662.

In such conventional method, however, although electronic appliances of the same type can be discriminated, the information of the individual electronic appliances such as the guarantee, manufacturing date and so on cannot be directly written in or read from the electronic appliances by the user.

DISCLOSURE OF THE INVENTION

The invention is made in view of the above circumstance, and it is hence an object thereof to present a constitution in which the user can easily recognize the electronic appliances of the same type, and the user can directly read and write necessary information from and in the individual electronic appliances.

A first invention relates to an information processing apparatus controlled by transmission of command conforming to a specific protocol from other appliance mutually connected through a bus, comprising memory means for storing a descriptor that can be read by the command as a hierarchical list, and control means for writing text data or graphic data relating to the appliance, inputted by specific operation or command, at a specified position in the hierarchical descriptor stored in the memory means. Therefore, the text data or graphic data relating to the appliance is written in a part of the hierarchical descriptor that can be read or written by a specific command, and by using the written data, information necessary for identifying the appliance can be easily obtained.

A second invention relates to the information processing apparatus of the first invention, in which the text data or graphic data written in by the control means is data relating to the name of the appliance. Therefore, the name of the appliance can be easily set by the user's input or the like.

A third invention relates to the information processing apparatus of the first invention, in which the text data or graphic data written in by the control means is made as memo data entered in relation to the appliance. Therefore, various memos relating to the appliance can be easily stored in the appliance by the user's input or the like, and read out when necessary.

A fourth invention relates to the information processing apparatus of the first invention, in which the text data or graphic data written in the memory means by the control means is written in a part of the hierarchical descriptor. Therefore, when reading out the text data or graphic data written in the memory means from other appliance, by tracing along the hierarchical structure, the memory position of the desired data can be reached easily, and it can be read out easily.

A fifth invention relates to the information processing apparatus of the first invention, in which the text data or graphic data written in the memory means by the control means is written in other descriptor than the hierarchical descriptor, and the information of the writing position is written in the hierarchical descriptor. Therefore, based on the instruction in the hierarchical descriptor, the memory position of the text data or graphic data written in the memory means can be easily judged, and the text data or graphic data relating to the appliance can be easily read out.

A sixth invention relates to the information processing apparatus of the first invention, in which the text data or graphic data written in the memory means by the control means is composed of a plurality of of data. Therefore, a plurality of of data relating to the apparatus can be held.

A seventh invention relates to the information processing apparatus of the sixth invention, in which a specific one of the a plurality of data is read out by priority from the memory means and used. Therefore, when a plurality of data relating to the appliance are held, the data to be used is determined according to a specific condition.

An eighth invention relates to an information processing apparatus capable of controlling other appliance mutually connected through a bus by transmission of a command conforming to a specific protocol, comprising input means for inputting text data or graphic data, and transmitting means for transmitting a command for writing in the text data or graphic data inputted by the input means to the descriptor of the other appliance as the data relating to the appliance through the bus. Therefore, information necessary for identifying the appliance connected through the bus can be easily written in.

A ninth invention relates to an information processing apparatus capable of controlling other appliance mutually connected through a bus by transmission of a command conforming to a specific protocol, comprising transmitting means for transmitting a command for reading out memory data of the text data or graphic data concerning the appliance to the descriptor of the other appliance through the bus, and control means for using the text data or graphic data as display data for recognizing the other appliance when receiving the text data or graphic data added to a response based on the command sent out from the transmitting means. Therefore, the information for identifying the appliance, stored in the appliance connected through the bus, can be easily read out and displayed.

A tenth invention relates to an information processing system composed of a first appliance and a second appliance mutually connected through a specific bus, in which the first appliance stores the text data or graphic data relating to the own appliance at a specific position of a descriptor which can be read out by a command conforming to a specific protocol, and the second appliance sends a command for reading out the text data or graphic data stored at the specific position of the descriptor of the first appliance, and uses the text data or graphic data obtained by the response based on that command as the display data for recognizing the first appliance. Therefore, the information necessary for identifying the appliance connected through the bus can be easily written into the corresponding appliance, and the information necessary for identifying being written in that appliance can be easily read out and displayed.

An eleventh invention relates to an information processing method in which a descriptor which can be readout by a specific command conforming to a specific protocol from other appliance mutually connected through a bus is stored as a hierarchical list, and text data or graphic data relating to the own appliance inputted by a specific operation or command is writter at a specific position in the stored hierarchical descriptor. Therefore, the text data or graphic data relating to the appliance is written in a part of the hierarchical descriptor which can be read or written by a specific command, and by using the written data, the information necessary for identifying the appliance can be easily obtained.

A twelfth invention relates to the information processing method of the eleventh invention, in which the text data or graphic data to be writter is made as data relating to the name of the appliance. Therefore, the name of the appliance can be easily set by user's input or the like.

A thirteenth invention relates to the information processing method of the eleventh invention, in which the text data or graphic data to be written is made as memo data inputted in relation to the appliance. Therefore, various memos relating to the appliance can be easily stored in the appliance by the user's input or the like, and read out when necessary.

A fourteenth invention relates to the information processing method of the eleventh invention, in which the text data or graphic data to be written is written in a part of the hierarchical descriptor. Therefore, when reading out the text data or graphic data written from other appliance, by tracing along the hierarchical structure, the memory position of the desired data can be reached easily, and it can be read out easily.

A fifteenth invention relates to the information processing method of the eleventh invention, in which the text data or graphic data to be written is written in other descriptor than the hierarchical descriptor, and the information of the writing position is written in the hierarchical descriptor. Therefore, based on the instruction in the hierarchical descriptor, the memory position of the text data or graphic data written in can be easily judged, and the text data or graphic data relating to the appliance can be easily read out.

A sixteenth invention relates to the information processing method of the eleventh invention, in which the text data or graphic data to be written is composed of a plurality of pieces of data. Therefore, a plurality of pieces of data relating to the apparatus can be held.

A seventeenth invention relates to the information processing method of the sixteenth invention, in which a specific one of the a plurality of pieces of data is read out with priority and used. Therefore, when a plurality of pieces of data relating to the appliance are held, the data to be used is determined according to a specific condition.

An eighteenth invention relates to an information processing method capable of controlling other appliance mutually connected through a bus by transmission of a command conforming to a specific protocol, comprising a process of inputting text data or graphic data, and a process of transmitting a command for writing in the text data or graphic data inputted by the above process to the descriptor of the other appliance as the data relating to the appliance through the bus. Therefore, the information necessary for identifying the appliance connected through the bus can be easily written in.

A nineteenth invention relates to an information processing method capable of controlling other appliance mutually connected through a bus by transmission of a command conforming to a specific protocol, comprising a process of transmitting a command for reading out memory data of the text data or graphic data about the appliance to the descriptor of the other appliance through the bus, and a process of using the text data or graphic data as display data for recognizing the other appliance when receiving the text data or graphic data added to the response based on the command sent out at the above process. Therefore, the information for identifying the appliance stored in the appliance connected through the bus can be easily read out and displayed.

A twentieth invention relates to a providing medium for providing a program which can be read by a computer for executing the process comprising a step of holding a description which can be read out by a specific command conforming to a specific protocol from other appliance mutually connected through a bus as a hierarchical list, and a step of writing text data or graphic data relating to the own appliance inputted according to a specific operation or command at a specific position of the hierarchical descriptor. Therefore, by using the program provided by the medium, the text data of graphic data relating to the appliance is written in a part of the hierarchical descriptor which can be read or written by a specific command, and by using the written data, the information necessary for identifying the appliance can be easily obtained.

BRIEF DESCRIPTION OF THE DRAWINGS

FIG. 5 is a diagram for explaining a nickname list.

FIG. 6 is a diagram for explaining the format of entry specific information of the nickname list.

FIG. 7 is a diagram for explaining a user specific info list.

FIG. 8 is a diagram for explaining the format of entry specific information of the user specific info list.

FIG. 10 is a diagram for explaining the descriptor identifier of a unit status descriptor.

FIG. 11 is a diagram for explaining the format of the unit status descriptor.

FIG. 12 is a diagram for explaining the format of a general unit status in FIG. 11.

FIG. 13 is a diagram for explaining the info type in FIG. 12.

FIG. 16 is a diagram for explaining an example of data structure of a command or response.

BEST MODE FOR CARRYING OUT THE INVENTION

An embodiment of the invention will be described below.

Figure 1:
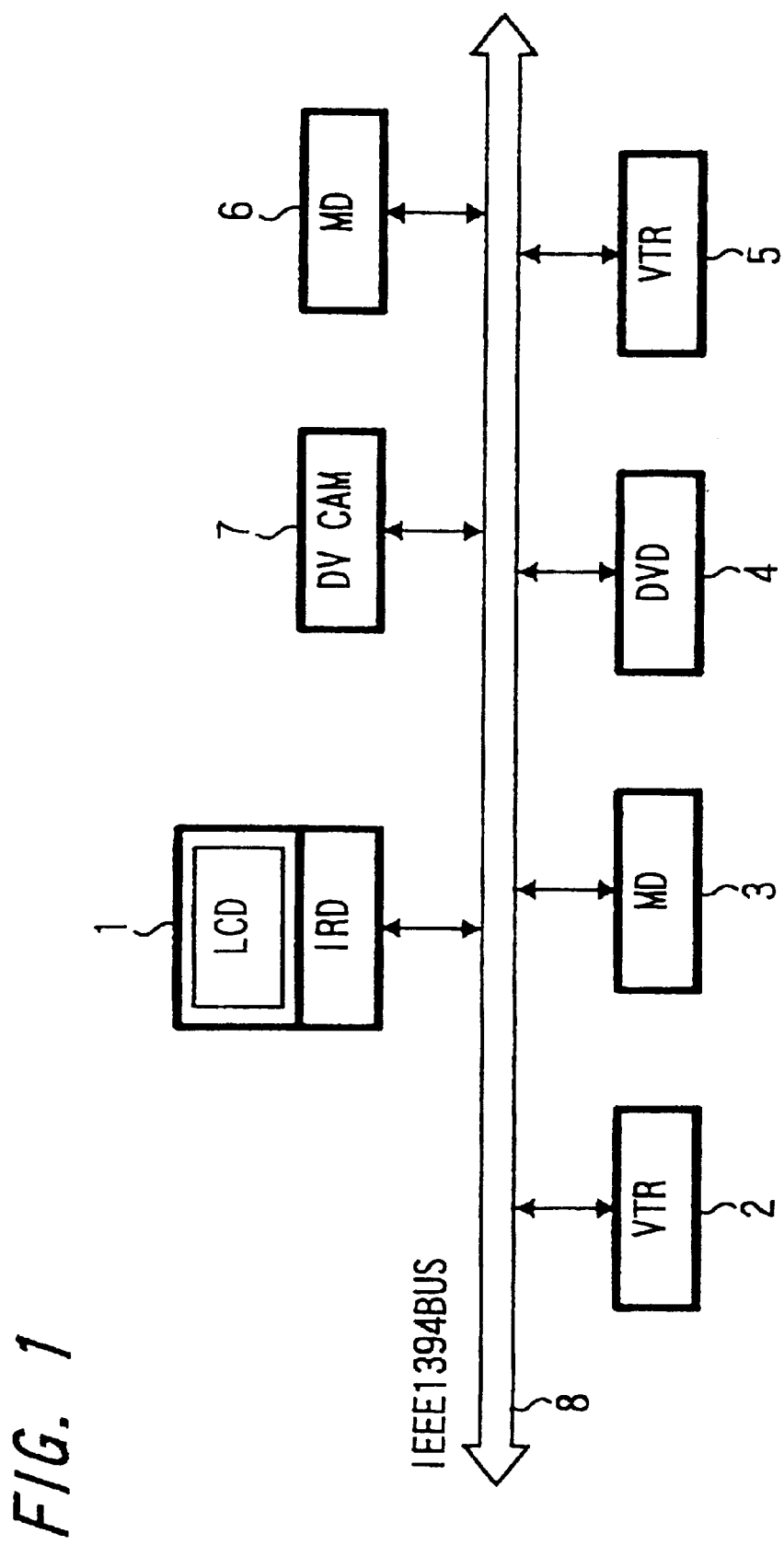
FIG. 1 is a block diagram showing an embodiment of an information processing system according to the invention.

FIG. 1 is a block diagram showing a constitution of an embodiment of an information processing system according to the present invention. In this embodiment, through an IEEE 1394 bus 8, an IRD (integrated receiver decoder) 1, a VTR (video tape recorder) 2, a MD (mini disk) deck 3, a DVD (digital versatile disk) player 4, a VTR 5, a MD deck 6, and a DVCAM (digital video camera) 7 are mutually connected.

These AV appliances are made mutually controllable by a specified command (AV/C command transaction set: hereinafter called an AV/C command) for transmission on an IEEE 1394 system bes. An appliance conforming to the AV/C command is provided with a descriptor describing the function that can be realized by that appliance, and by using this description, necessary data for controlling from other appliance can be obtained. The detail of the IEEE 1394 system bus and the AV/C command is disclosed at http://www.1394TA.org.

Figure 2:
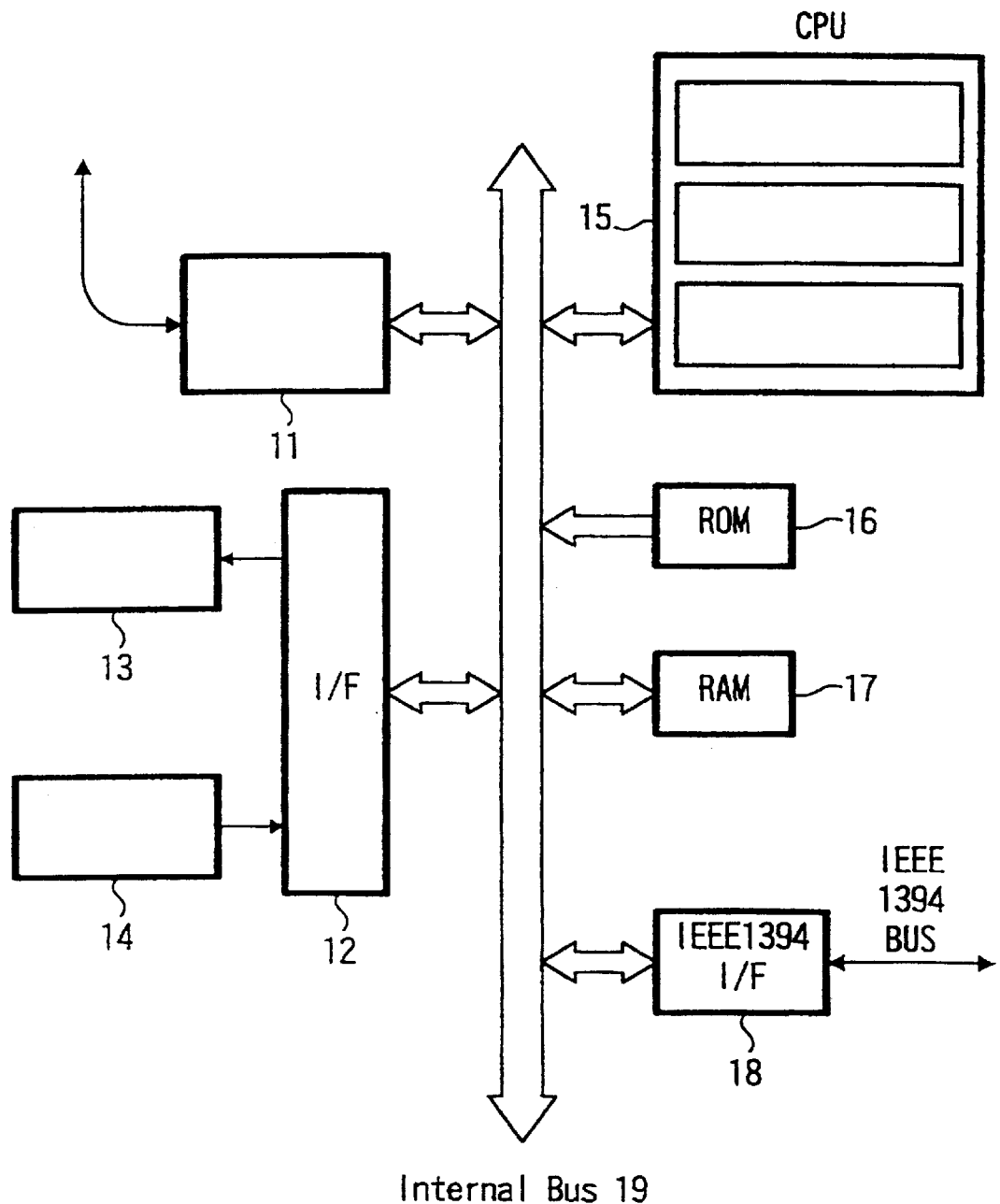
FIG. 2 is an internal block diagram of an IRD 1 in FIG. 1.

FIG. 2 is an internal block diagram of the IRD 1. A tuner unit 11 operates an antenna (not shown), and issues a video signal and an audio signal based on a signal from the antenna. An LCD (liquid crystal display) 13 and a touch panel 14 are connected to an internal bus 19 through an input and output interface 12. The LCD 13 shows the display data supplied from the tuner unit 11, a CPU (central processing unit) 15, or an IEEE 1394 interface 18. The touch panel 14 is designed to supply a signal corresponding to a user's operation to the input and output interface 12.

The CPU 15 actually executes various programs. A ROM (read only memory) 16 basically stores fixed data out of programs and operation parameters used by the CPU 15. A RAM (random access memory) 17 stores the data varying when the CPU 15 executes the program as required. The IEEE 1394 interface 18 is an input and output interface conforming to the IEEE 1394 to which the IEEE 1394 bus 8 is connected. The tuner unit 11, the input and output interface 12, the CPU 15, the ROM 16, the RAM 17 and the IEEE 1394 interface 18 are mutually connected through the internal bus 19.

Figure 3:
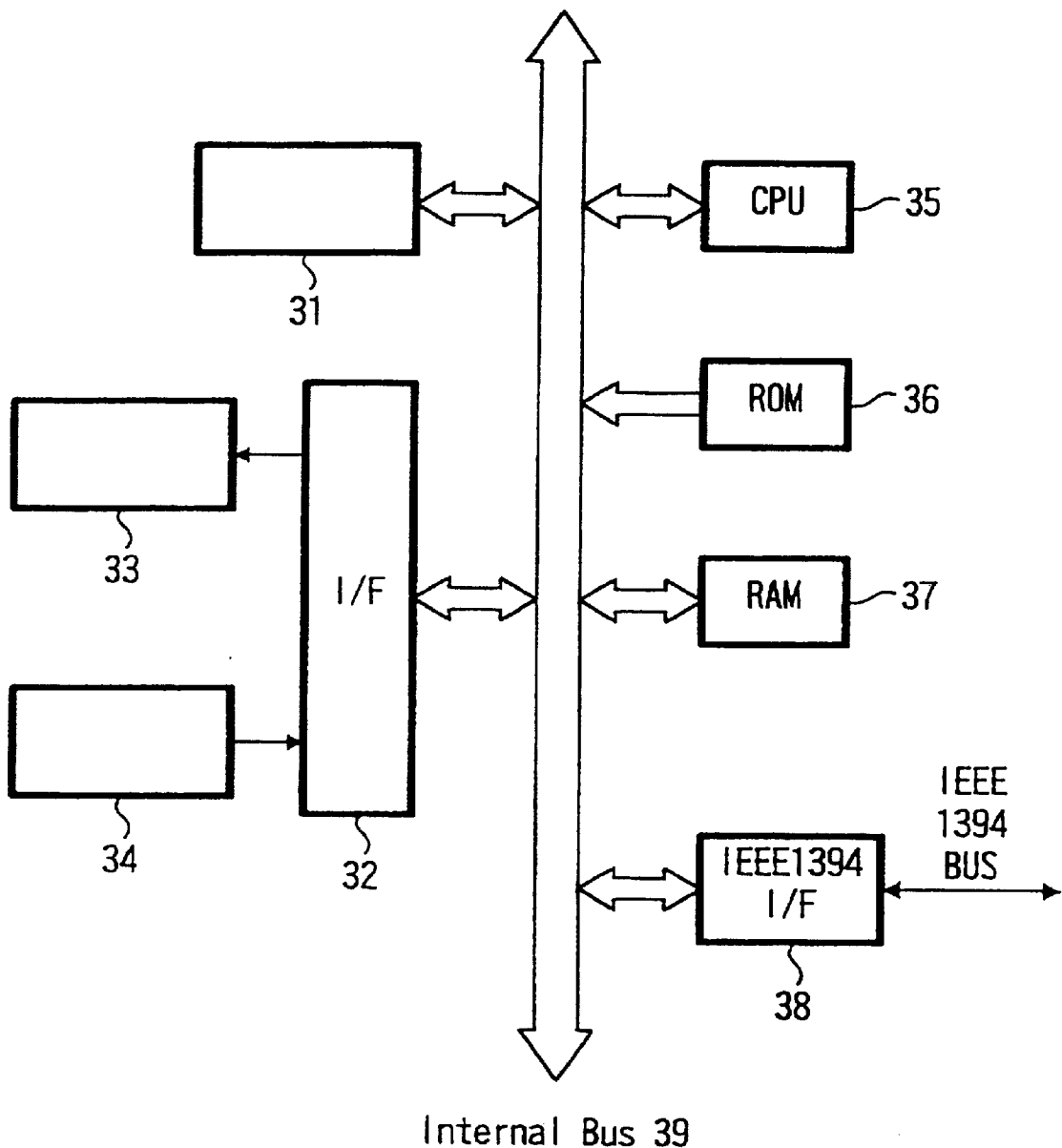
FIG. 3 is an internal block diagram of an MD deck 3 in FIG. 1.

FIG. 3 is an internal block diagram of the MD deck 3. A recording and reproducing unit 31, an input and output interface 32, a CPU 35, a ROM 36, a RAM 37, and an IEEE 1394 interface 38 are mutually connected through an internal bus 39. The recording and reproducing unit 31 records the data supplied through the internal bus 39 on a loaded MD (not shown). It also reproduces the data from the loaded MD. The input and output interface 32, an LCD 33, a touch panel 34, the CPU 35, the ROM 36, the RAM 37, and the IEEE 1934 interface 38 function same as the input and output interface 12, the LCD 13, the touch panel 14, the CPU 15, the ROM 16, RAM 17 and the IEEE 1934 interface 18 in FIG. 2, so that their description will be omitted.

The AV/C command employed in the control of the AV appliance in FIG. 1 will be explained. In the AV/C command, four types of commands are defined, namely, a command, for controlling the appliance from outside (CONTROL), a command for inquiring the status from the outside (STATUS), a command for inquiring the presence or absence of support of control command from the outside (GENERAL INQUIRY, SPECIFIC INQUIRY), and a command for notifying the status change to the outside (NOTIFY). A response is sent back according to the type of the command.

More specifically, subunit type and subunit id show the destination of the command and the transmission source of the response. In the AV/C command, logically, the appliance itself is called the unit, and the part responsible for function of the appliance is called the subunit. In order to distinguish when a plurality of subunits of the same type are present, the command is addressed by the subunit id as the discriminating number. An opcode is a command, and an operand is the parameter of a command. They are defined at each subunit type.

For reading or writing the descriptor, after acquiring the access right by an OPEN DESCRIPTOR command, a READ DESCRIPTOR command or a WRITE DESCRIPTOR command is sent out.

The unit has a logical plug as entrance and exit of signals exchanged with the outside. The unit plug includes a serial bus plug for the IEEE 1394, and an external plug for other than the IEEE 1394. Similarly, a logical plug is also defined in the subunit. By connecting the subunit plugs mutually, and connecting the subunit plug and the unit plug, a signal path inside the unit can be built up.

Figure 4:
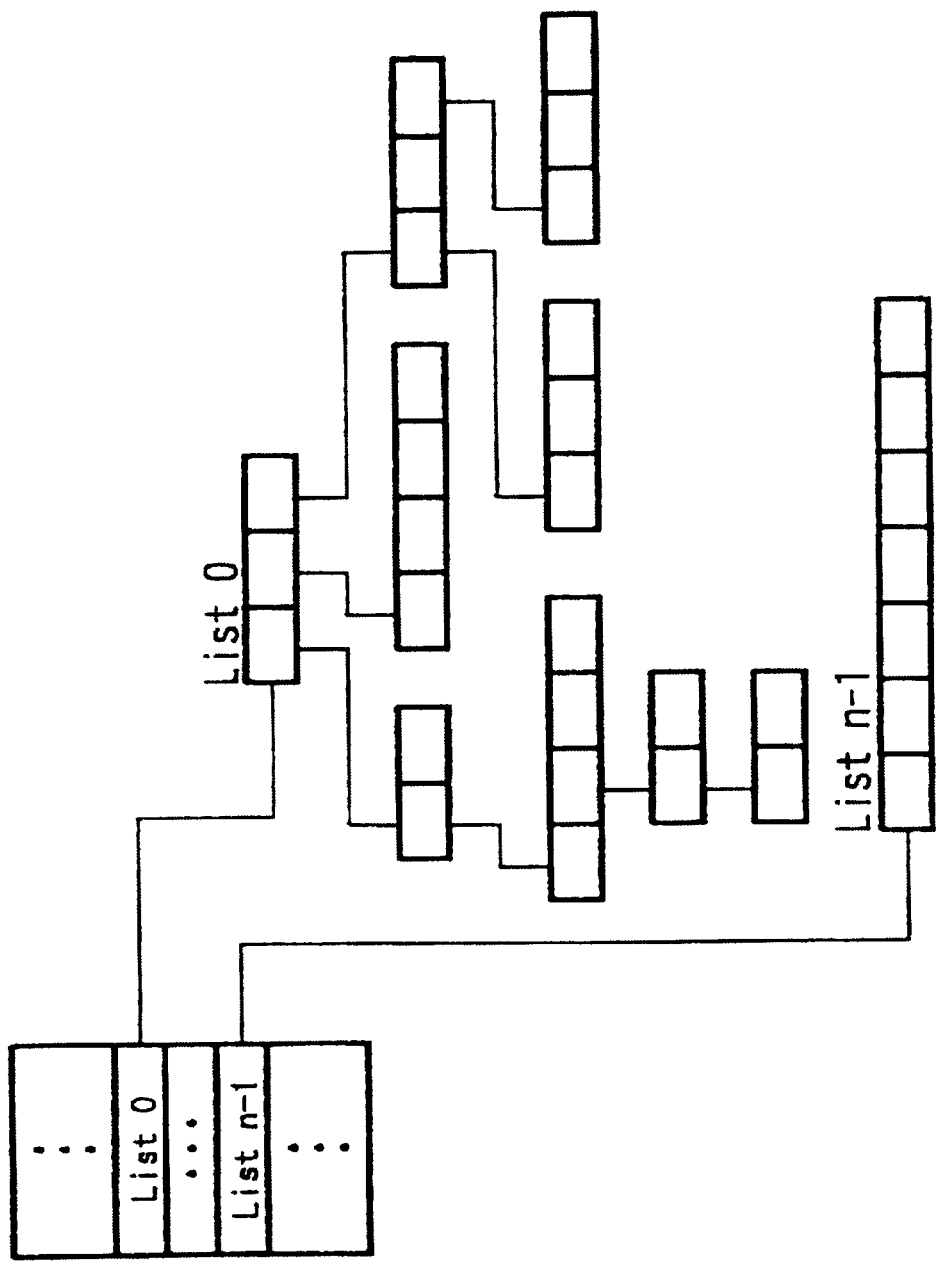
FIG. 4 is a diagram for explaining the data structure of a descriptor.

FIG. 4 shows the data structure of the descriptor used in the AV/C command set. As shown in FIG. 4, each list has a hierarchical structure, and the highest layer (for example, list 0) of the hierarchical structure is the root list.

FIG. 5 shows the format of an object entry. Herein, a Nickname is entered as an object. This Nickname indicates the text data or graphic data (image data) as the nickname for the appliance (unit) inputted by a user or the like. As shown in FIG. 5, '10' is set in an entry type value. FIG. 6 shows the format of entry specific information which follows the object entry in FIG. 5. A language id is to identify a language. In a string info, data (text data or graphic data) is described.

FIG. 7 shows a format when a User Specific Info is entered as an object. This User Specific Info indicates the text data as a memo (such as aome comment on the appliance) to the appliance (unit) entered by the user or the like. As shown in FIG. 7, '11' is set in the entry type value. FIG. 8 shows a format of entry specific information which follows the object entry in FIG. 7. A language id is to identify a language. In a string info, data (text data) is described.

Figure 9:
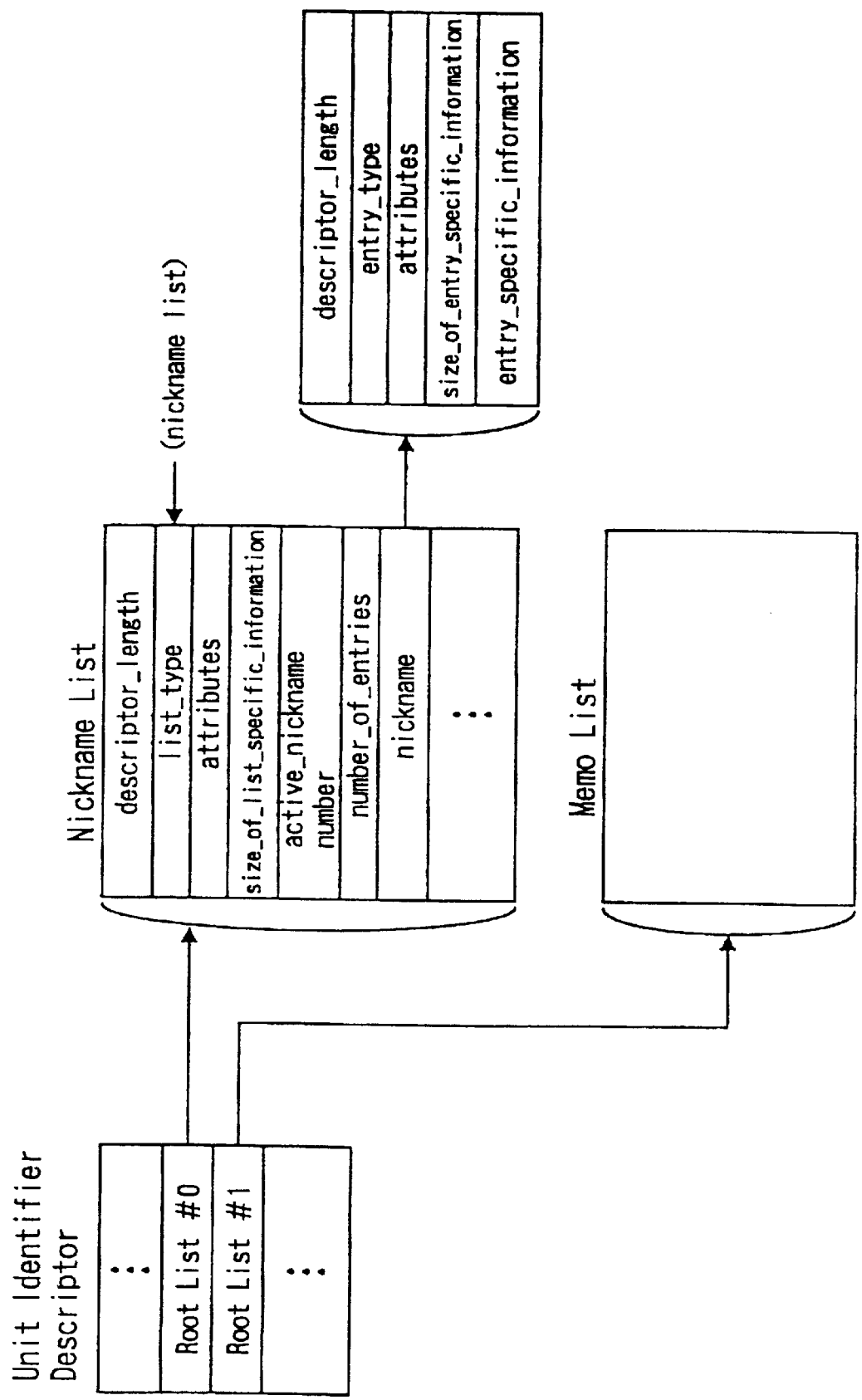
FIG. 9 is a diagram for explaining the relation between a unit identifier descriptor and the nickname list.

Herein, the relation between the unit identifier descriptor and the nickname list is shown in FIG. 9. The descriptor of the nickname list is stored at a position indicated by the address (for example, list #0) of a specified root list indicated by the unit identifier descriptor (this descriptor is of the same type as the subunit identifier descriptor) positioned at a higher layer of the hierarchical descriptor as shown in FIG. 4. This nickname list makes use of the object list type specified by the AV/C command. That is, successively to the data of descriptor length indicating the length of the descriptor, the data of the list type indicating the type of the list is described. This list type shows the nickname list. Next, same as in the case of the object list, the data of attributes and size of list specific information are described, and then the data of an active nickname number indicating the active nickname number is described. Next comes the data of number of entries showing the number of entries, which is followed by the list of nicknames. In this list of nicknames, a list of a plurality of nicknames can be described, and by the data of the active nickname number mentioned above, the number showing the nickname list to be used with priority among the a plurality ofity is indicated.

The descriptor of each nickname designated in this list makes use of the type of the object entry descriptor defined by the A/V command as shown at the right side of FIG. 9. That is, next to the data of descriptor length indicating the length of the descriptor, the data of entry type showing the type of the entry is described, and further the data of attributes and size of list specific information are described, being followed by the description of the data of entry specific information. This entry specific information is the data composed as shown in FIG. 6, and the text data which is the data of the nickname itself graphic data (image data) and so on are described therein.

The descriptor of this nickname makes use of the type of the object entry descriptor defined by the AV/C command, but a child list ID and an object ID are not necessary, and such IDs are not required in the attributes, and the data of the corresponding positions may be set as 0 data.

At a position indicated by other address (for example, list #1) in the specific root list indicated by the unit identifier descriptor, the descriptor of the User Specific Info (so-called memo data: user information) is stored. The list of User Specific Info and the descriptor of the user Specific Info positioned at its lower layer are basically same as in the case of the nickname mentioned above, and the entry specific information is made as the data composed as shown in FIG. 8, and the text data which is the data of the memo itself and others are described therein. In the case of memo data (use information), incidentally, if a plurality of pieces of data are present in one appliance (unit), the data to be used with priority among them is indicated.

FIG. 10 is a format showing the identifier of the unit status descriptor. The unit status descriptor has the function as the pointer to the nickname of the appliance being used presently, and the address in which the user information is stored. As shown in FIG. 10, '80' is set in its contents.

FIG. 11 shows a format of unit status descriptor. The descriptor length shows the overall length of the unit status descriptor. In the general unit status, the nickname of the appliance being used at the present and the user information are described. The number of input plugs shows the total number of input plugs. The input plug status shows the status of the input plug being used. That is, as mentioned above, each unit (appliance) has a logical plug as the entrance and exit of signals exchanged with the outside, and it shows the status of the input plug being used as the serial bus plug for this purpose. The number of output plugs shows the total number of output plugs. The output plug status shows the status of the output plug being used. Herein, the data also shows the status of the output plug being used as the serial bus plug.

FIG. 12 shows a format of the general unit status in FIG. 11. The number of information shows the total number of pieces of information. The info type shows the type of information, which conforms to FIG. 13 shown below. The descriptor identifier for the information shows the identifier of the information descriptor.

FIG. 13 shows a format of the info type in FIG. 12. In the case of nickname, '10' is set, and in the case of user information (memo data), '11' is set.

Figure 14:
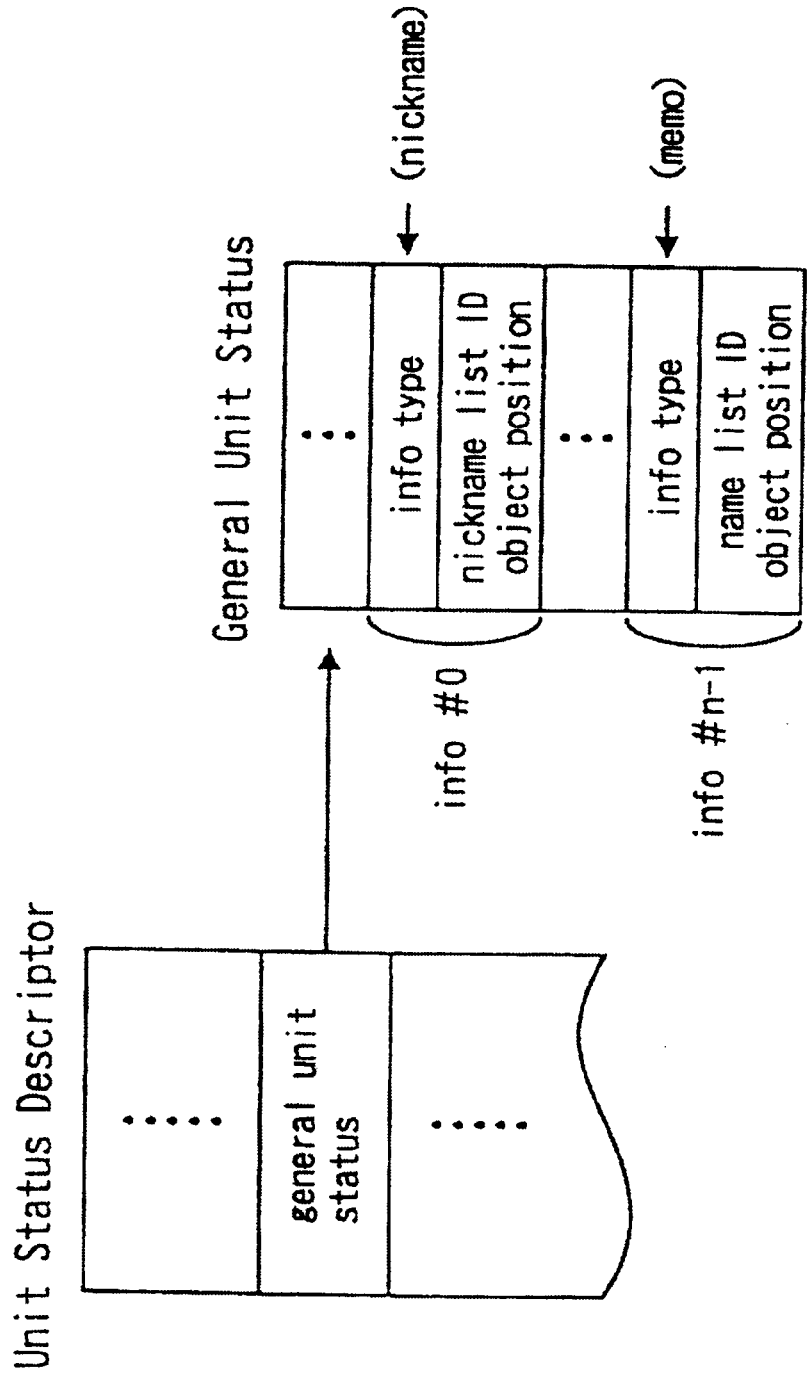
FIG. 14 is a diagram for explaining the relation between the unit status descriptor and the general unit status.

Herein, the relation between the unit status descriptor and the general unit status is shown in FIG. 14. The information written in the general unit status of the unit status descriptor is handled as the nickname and user information being used at the present. The info type in the detail of this general unit status shows the nickname and user information (memo data), and the nickname list ID object position is used as the pointer for indicating the position of the nickname data to be used with highest priority, and the memo list ID object position is used as the pointer for showing the position of the memo data (user information) used with the highest priority.

Figure 15:
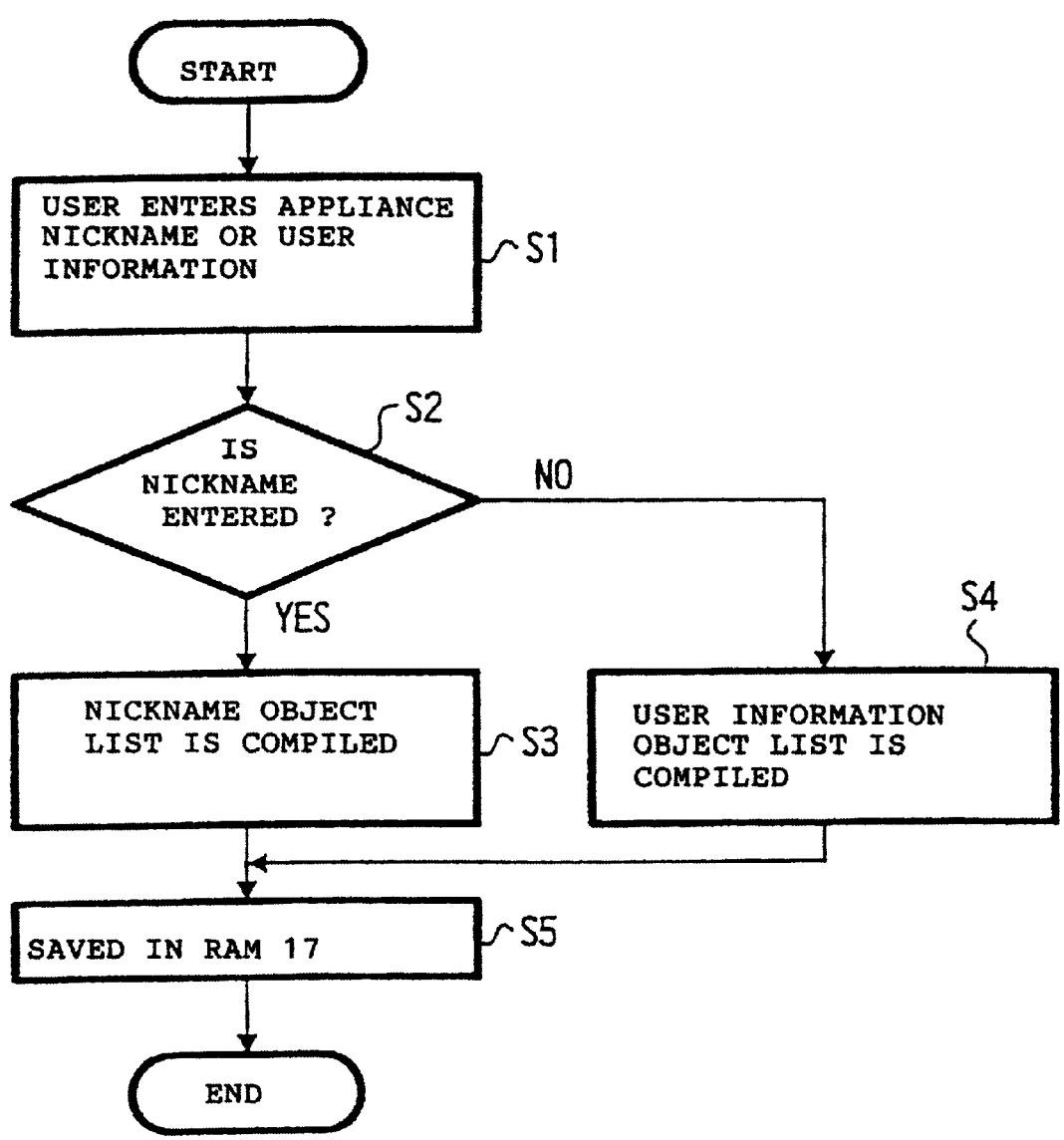
FIG. 15 is a flowchart for setting the nickname or user information.

The operation for setting the nickname or user information in the appliance is explained by referring to the flowchart in FIG. 15. First, at step S1, the user manipulates the touch panel 14, and enters the nickname or user information of the appliance, and then the process advances to step S2.

At step S2, the CPU 15 judges whether the user has entered the nickname or not. When the nickname has been entered, the CPU 15 generates a nickname object list 41 at step S3, and the process advances to step S5. At step S5, the CPU 15 stores the nickname object list 41 in the RAM 17, and the process is over.

At step S2, on the other hand, if it is judged to be not the nickname (if it is judged to be the user information), the process advances to step S4, and the CPU 15 generates a user information object list 61, and the process advances to step S5. At step S5, the CPU 15 stores the user information object list 61 in the RAM 17, and the process is over. The nickname and the user information conld be set plural. In this case, the information used with the highest priority is indicated by the data in the descriptor as mentioned above.

In this explanation, by the manipulation of the user of the appliance itself, the nickname or the user information is set, but since the nickname or user information is written into the memory by using the descriptor specified by the protocol of the AV/C command, by transmitting the command specified by the AV/C command for writing into this descriptor to the corresponding appliance through the bus 8, the nickname or user information from other appliance can be written. In this case, at first, after transmitting an open command for opening the descriptor, a write (writting-in) command for writing into the descriptor is transmitted, and the nickname or user information is written into the corresponding position of the descriptor. FIG. 16 shows a diagram of packet structure for transmitting the command in this case. The control is indicated by the ctype, the appliance is identified by the unit type, open or write is indicated by the opcode, and by using the area available as the operand, the data relating to the nickname or user information is transmitted sequentially together with the necessary data such as type, data length or the like of the descriptor.

The nickname or user information thus written into each appliance is transmitted by the response from the corresponding appliance by transmitting a read (READ) command specified by the AV/C command from other appliance, and the other appliance connected by the bus easily knows the nickname or user information about that appliance, and the nickname of the appliance may be displayed or the user information may be displayed at the same time when displaying the information about the appliance connected by the bus. The packet structure transmitted at this time is as shown in FIG. 16, in which the opcode in the packet becomes the read or response.

By giving the nickname or user information in such a manner, when a plurality of appliances of a same type are connected, the appliances can be easily identified by setting familiar names for the user, such as Toro's VTR, Hanako's VTR and so on.

For one appliance, the name is not limited to one, but a plurality of names may be set according to various situations of the user.

Moreover, since the user information object list is not limited in the quantity of data, as far as the memory permits, text data and image (graphic data) can be entered freely. As the user information, various data relating to the appliance can be entered freely. For example, the date of purchasing the appliance, and the dealer can be entered. Or the data of the guarantee and date of manufacture of the appliance may be written in a similar form at the manufacturing company or the dealer's shop.

In the embodiment, since each item is handled as one object, and a list is formed by combining a plurality of objects, it is easy to add, change or delete the items.

In the unit status descriptor, not the data itself, but the pointer to the priority items in each list is written, and hence it is not necessary to possess the same information in an overlapped fashion, and the memory can be used effectively.

By the way in the explanation so far, the descriptor in which the data is written is set in each appliance, but it may be also realized, for example, as a providing medium stored in the information recording medium such as a magnetic disk, a CD-ROM or the like storing the computer program for executing such process. In such a case, the providing medium includes, aside from a physical medium, a transmitting medium in the Internet, network of digital satellites and so on.

As described herein, since the user can set familiar names, it is possible to identify a plurality of electronic appliances of the same type easily. Moreover, since the user information can be set, the paper medium such as guarantee card or the like is not needed. Still more, since the priority items can be set, the present status of the electronic appliance can be known.

What is claimed is:

1. An information processing apparatus controlled by transmission of command conforming to a specific protocol from other appliance mutually connected through a bus, comprising:

memory means for storing a descriptor that can be read by said command as a hierarchical list, and control means for writing text data or graphic data relating to an appliance, entered on a basis of a specific operation or command, at a specified position in the hierarchical descriptor stored in said memory means.

2. The information processing apparatus as claimed in claim 1, wherein the text data or graphic data written in by said control means is data relating to a name of an appliance.

3. The information processing apparatus as claimed in claim 1, wherein the text data or graphic data written in by said control means is memo data entered in relation to an appliance.

4. The information processing apparatus as claimed in claim 1, wherein the text data or graphic data written in said memory means by said control means is written in a part of the hierarchical descriptor.

5. The information processing apparatus as claimed in claim 1, wherein the text data or graphic data written in said memory means by said control means is written in other descriptor different from the hierarchical descriptor, and information of the writing position is written in said hierarchical descriptor.

6. The information processing apparatus as claimed in claim 1, wherein the text data or graphic data written in said memory means by said control means is composed of a plurality of pieces of data.

7. The information processing apparatus as claimed in claim 6, wherein a specific one of said a plurality of pieces of data is read out with priority from said memory means and used.

8. An information processing apparatus capable of controlling other appliance mutually connected through a bus by transmission of a command conforming to a specific protocol, comprising:

input means for entering text data or graphic data, and transmitting means for transmitting a command for writing the text data or graphic data entered by said input means to a descriptor of said other appliance as data relating to the appliance through said bus.

9. An information processing method capable of controlling other appliance mutually connected through a bus by transmission of a command conforming to a specific protocol, comprising:

a process of entering text data or graphic data, and a process of transmitting a command for writing text data or graphic data entered by said process to the descriptor of said other appliance as data relating to that appliance through said bus.

10. A providing medium for providing a program which can be read by a computer for executing a process comprising:

a step of holding a descriptor which can be read out by a specific command conforming to a specific protocol from other appliance mutually connected through a bus, as a hierarchical list, and a step of writing text data or graphic data relating to a corresponding appliance, entered on a basis of a specific operation or command, at a specific position in said hierarchical descriptor.

11. An information processing method comprising the steps of:

storing a descriptor which can be readout by a specific command conforming to a specific protocol from other appliance mutually connected through a bus as a hierarchical list, and processing to write text data or graphic data relating to that appliance, entered by a specific operation or command, at a specific position in the stored hierarchical descriptor.

12. The information processing method as claimed in claim 11, wherein said text data or graphic data to be written is data relating to a name of an appliance.

13. The information processing method as claimed in claim 11, wherein said text data or graphic data to be written is memo data entered in relation to an appliance.

14. The information processing method as claimed in claim 11, wherein said written text data or graphic data is written in a part of a hierarchical descriptor.

15. The information processing method as claimed in claim 11, wherein said text data or graphic data to be written is written in other descriptor different from the hierarchical descriptor, and information of the writing position is written in said hierarchical descriptor.

16. The information processing method as claimed in claim 11, wherein said text data or graphic data to be written is composed of a plurality of pieces of data.

17. The information processing method as claimed in claim 16, wherein a specific one of said a plurality of data is read out with priority and used.

* * * * *